(12) United States Patent
Kostecki

(10) Patent No.: US 11,712,746 B1
(45) Date of Patent: Aug. 1, 2023

(54) WIRE FEEDER ASSEMBLY

(71) Applicant: Andrew Kostecki, Mooresville, NC (US)

(72) Inventor: Andrew Kostecki, Mooresville, NC (US)

(*) Notice: Subject to any disclaimer, the term of this patent is extended or adjusted under 35 U.S.C. 154(b) by 449 days.

(21) Appl. No.: 16/929,533

(22) Filed: Jul. 15, 2020

Related U.S. Application Data

(60) Provisional application No. 62/874,569, filed on Jul. 16, 2019.

(51) Int. Cl.
  B23K 9/12 (2006.01)
  B23K 9/133 (2006.01)
  F16H 1/20 (2006.01)
  B23K 9/04 (2006.01)

(52) U.S. Cl.
  CPC .......... B23K 9/125 (2013.01); B23K 9/042 (2013.01); B23K 9/133 (2013.01); B23K 9/1333 (2013.01); B23K 9/1336 (2013.01); F16H 1/20 (2013.01)

(58) Field of Classification Search
  CPC ......... B23K 9/125; B23K 9/042; B23K 9/133; B23K 9/1333; B23K 9/1336; F16H 1/20
  See application file for complete search history.

(56) References Cited

U.S. PATENT DOCUMENTS

| | | | |
|---|---|---|---|
| 2,474,534 A | 6/1949 | Knost | |
| 2,603,457 A | 7/1952 | Bishop | |
| 3,514,961 A | 6/1970 | Shuttleworth | |
| 3,672,655 A * | 6/1972 | Carter | B65H 51/10 226/108 |
| 5,362,937 A | 11/1994 | Browne et al. | |
| 5,914,464 A * | 6/1999 | Vogel | G01G 19/005 177/180 |
| 2008/0169335 A1 | 7/2008 | Aarnio | |
| 2009/0045035 A1 | 2/2009 | Helgerson et al. | |
| 2010/0326963 A1 | 12/2010 | Peters et al. | |
| 2011/0038974 A1 | 2/2011 | Schroder et al. | |
| 2012/0006520 A1 | 1/2012 | Sferlazzo et al. | |
| 2013/0001175 A1 | 1/2013 | Urban | |
| 2013/0273394 A1 | 10/2013 | Sheu et al. | |
| 2013/0327750 A1* | 12/2013 | Henche et al. | B23K 9/327 219/137.9 |
| 2017/0137229 A1 | 5/2017 | DeVries | |
| 2017/0355037 A1* | 12/2017 | Brock et al. | B23K 9/173 |
| 2017/0368637 A1 | 12/2017 | Giese et al. | |

FOREIGN PATENT DOCUMENTS

JP 02000326173 11/2000

* cited by examiner

Primary Examiner — Brian W Jennison
(74) Attorney, Agent, or Firm — Tuggle Duggins P.A.; Blake P. Hurt

(57) ABSTRACT

A wire feeder assembly of the type generally associated with an electric arc welding machine including a driveshaft in rotatable communication with an individually servo motor at one end and a worm gear assembly at the other end is provided. Due to the assembly's slim design, a series of assemblies can be deployed on a metal plate cladding machine spaced approximate 4 inches apart, which facilitates the construction of previously unattainable welding patterns.

17 Claims, 8 Drawing Sheets

WIRE FEEDER ASSEMBLY

This non-provisional patent application claims all benefits under 35 U.S.C. §119(e) of pending U.S. Provisional Pat. Application Serial No. 62/874,569 filed 16 Jul. 2019, entitled "Wire Feeder Assembly", in the United States Patent and Trademark Office, which is incorporated by reference in its entirety herein.

FIELD OF THE INVENTION

The invention herein pertains to welding components generally, and particularly pertains to a screw-driver wire feeder assembly with an individualized motor and reduced cross-sectional size for enhanced operation in tight quarters.

DESCRIPTION OF THE PRIOR ART AND OBJECTIVES OF THE INVENTION

Welding wire feeder assemblies for use in connection with electric welding systems are generally known in the art. Typically these assemblies include a series of drive and straightening wheels positioned within a housing and a motor in communication with a power supply configured to rotate, displace, or otherwise move the wire feeder assembly so as to facilitate the laying down of welding wire in a variety of longitudinal, lateral, and other pattern(s).

Due to the immense heat and energy expounded in the electric arc welding process, it is common to seek to reduce energy consumption from other sources. Specifically, the assemblies nearly always share a single motor in communication with a plurality of wire feeder assemblies via an axle that usually stretches transversely relative to the welding system. See for example, U.S. Pat. No. 5362937 to Browne and Kostecki, the disclosure of which is incorporated by reference herein in its entirety. The prior art wire feeders are also usually clad is bulky, robust housings that serve to limit all but the most rudimentary motion on the part of the wire feeder assemblies. Recent developments in cladding technology, the name for a process relating to the overlaying of weld metal onto metal plates in which the material such as mild steel used in the production of various apparatus is faced with a layer of weld metal deposited by welding means to provide a hard facing or alloy cladding, have led to a need for better wire feeder assemblies. See for example, U.S. Pat. No. 10,493,571 to Kostecki, the disclosure of which in incorporated herein in its entirety. In the more recent Kostecki application, the weld patterns contemplated by the cladding machine disclosed therein are simply not capable of being produced by the older Kostecki device.

Thus, in view of the problems and disadvantages associated with prior art devices, the present invention was conceived and one of its objectives is to provide a wire feeder assembly with a dedicated motor affixed thereto.

It is another objective of the present invention to provide a wire feeder assembly with a gear enmeshed in a drive shaft.

It is still another objective of the present invention to provide a wire feeder assembly with a drive shaft in communication with a servo motor and enmeshed with a worm gear.

It is yet another objective of the present invention to provide a wire feeder assembly with a plurality of feed rollers positioned within an assembly housing.

It is a further objective of the present invention to provide a wire feeder assembly with a plurality of wire straightener discs positioned within an assembly housing.

It is still a further objective of the present invention to provide a wire feeder assembly with one or more wire guides positioned within the assembly housing.

It is yet a further objective of the present invention to provide a wire feeder assembly with a pressure relief valve.

Various other objectives and advantages of the present invention will become apparent to those skilled in the art as a more detailed description is set forth below.

SUMMARY OF THE INVENTION

The aforesaid and other objectives are realized by providing a wire feeder assembly for use in connection with an electric arc welding machine, the wire feeder assembly intended to be deployed with a plurality of other wire feeder assemblies. Each wire feeder assembly is defined as a metal thermal fusion assembly positioning a power head spaced approximately four inches apart from the other wire feeder assemblies, each power head further comprising a worm gear-driven, individualized filler-metal feed unit that is liquid- or gas-cooled and that supplies electrical current to the power head which supplies voltage and current through insulating element(s) during arc welding activities. The assembly includes a housing containing a cylindrical drive shaft in communication with a servo motor at a first end and enmeshed with the worm gear via a series of threads at an opposing end. A drive gear is in rotatable communication with the worm gear via a bearing common between the respective gears, and the drive gear in turn is in communication either directly or indirectly with four feeder gears. Each feeder gear is connected to an annular feeder disc defining a channel sized and shaped to pass the welding wire therethrough. One or more wire guides direct the welding wire through the wire feeder assembly casing, and a series of seven straightening discs opposingly disposed above and below the path of the wire guides ensure that the welding wire remains in a straight configuration as it exits the feeder assembly and is ignited by the electric tip of the power head. Each wire feeder assembly is individually controlled and every other assembly is configured to permit a transverse "scissor" horizontal motion with an oscillating backward/forward of the forward indexing motion of a base metal plate on the welding machine in a multi-axis movement pattern designed to form a variety of weld patterns as may be desirable. The narrow profile of the wire feeder assembly disclosed herein allows up to 24 feeder assemblies to be deployed on a single machine spaced only four inches (10.16 cm) apart from one another.

DETAILED DESCRIPTION OF THE PREFERRED EMBODIMENT AND OPERATION OF THE INVENTION

Figure 1:
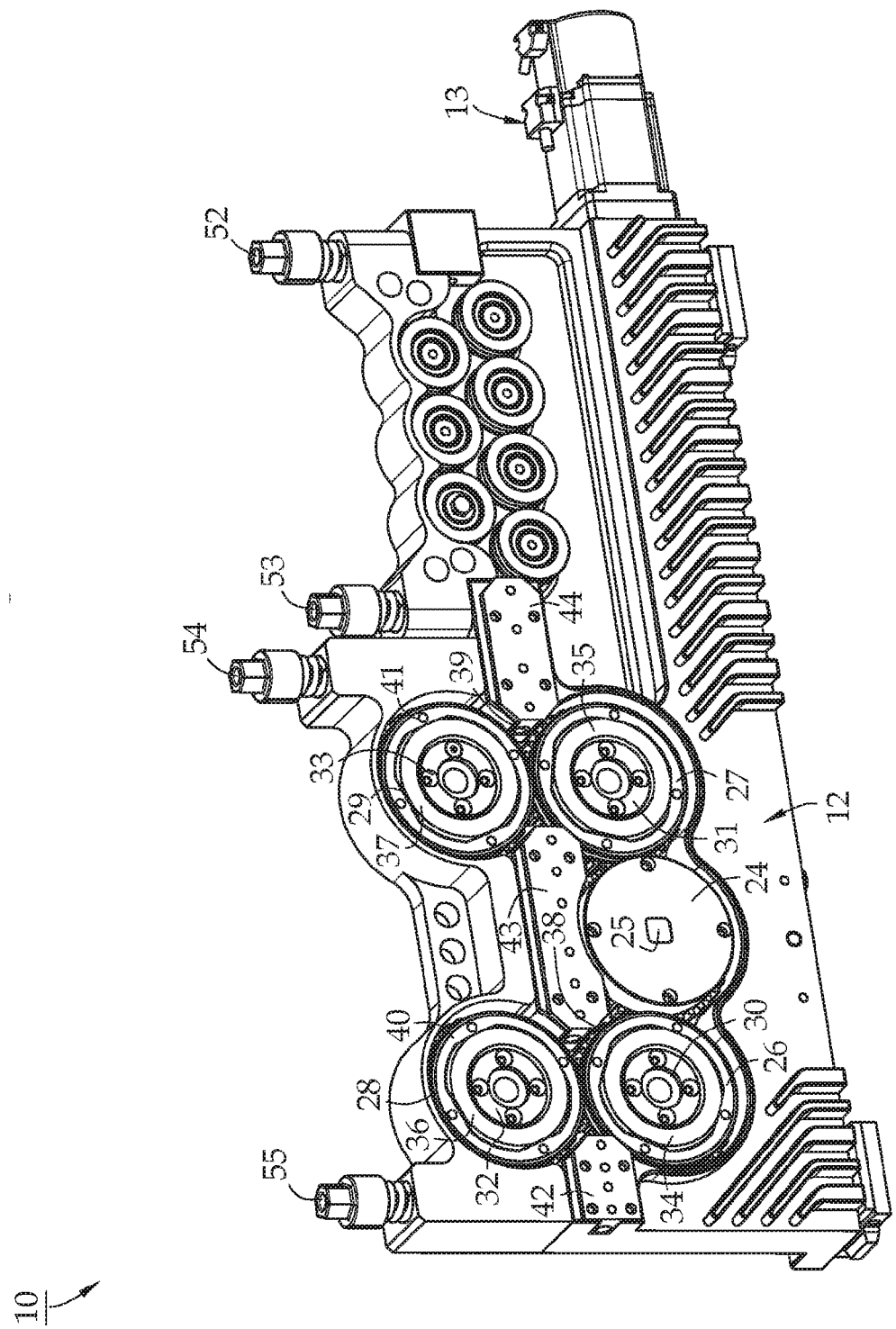
FIG. 1 shows a perspective view of the preferred embodiment of an improved wire feeder assembly.

Various exemplary embodiments of the present disclosure are described below. Use of the term "exemplary" means illustrative or by way of example only, and any reference herein to "the invention" is not intended to restrict or limit the invention to exact features or step of any one or more of the exemplary embodiments disclosed in the present specification. References to "exemplary embodiment", "one embodiment", "an embodiment", "various embodiments", and the like may indicate that the embodiment(s) of the invention so described may include a particular feature, structure, or characteristic, but not every embodiment necessarily includes the particular feature, structure, or characteristic. Further, repeated use of the phrase "in one embodiment", "in an exemplary embodiment", or "in an alternative embodiment" do not necessarily refer to the same embodiment, although they may.

It is also noted that terms like "preferably", "commonly", and "typically" are not utilized herein to limit the scope of the invention or to imply that certain features are critical, essential, or even important to the structure or function of the invention. Rather, these terms are merely intended to highlight alternative or additional features that may or may not be utilized in a particular embodiment of the present invention.

The present invention is described more fully hereinafter with reference to the accompanying figures, in which one or more exemplary embodiments of the invention are shown. Like numbers used herein refer to like elements throughout. The invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limited as to the scope of the invention, and any and all equivalents thereof. Moreover, many embodiments such as adaptations, variations, modifications, and equivalent arrangements will be implicitly disclosed by the embodiments described herein and fall within the scope of the instant invention.

Although specific terms are employed herein, they are used in a generic and descriptive sense only and not for the purposes of limitation. Unless otherwise expressly defined herein, such terms are intended to be given their broad, ordinary, and customary meaning not inconsistent with that applicable in the relevant industry ad without restriction to any specific embodiment hereinafter described. As used herein, the article "a" is intended to include one or more items. Where only one item is intended, the terms "one and only one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has previously been reduced to practice or that any testing has been performed. Likewise, unless stated otherwise, use of verbs in the past tense (present perfect or preterit) is not intended to indicate or imply that the invention has previously been reduced to practice or that any testing has been performed.

Figure 2:
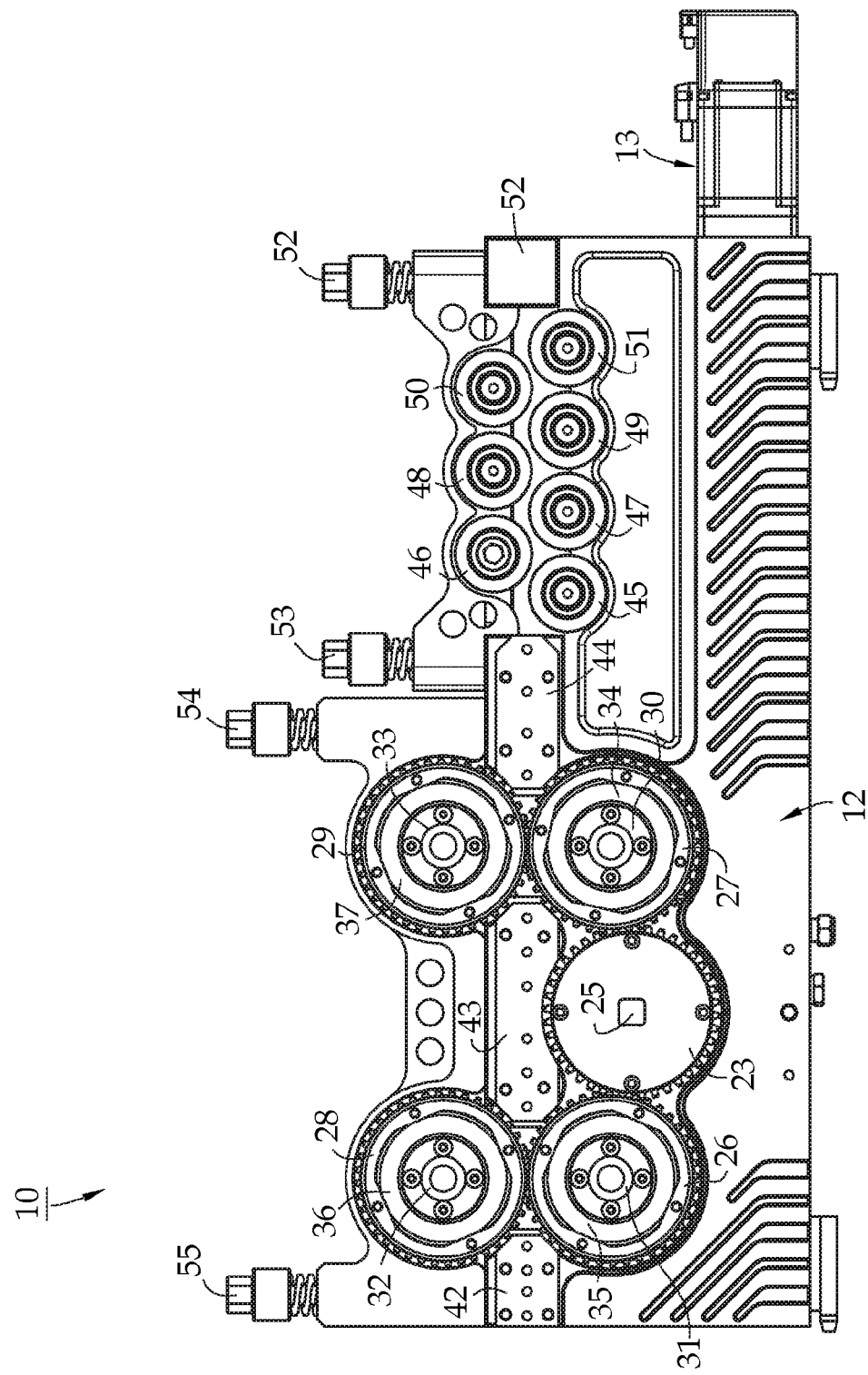
FIG. 2 pictures an elevated side view of the improved wire feeder assembly of FIG. 1.
Figure 3:
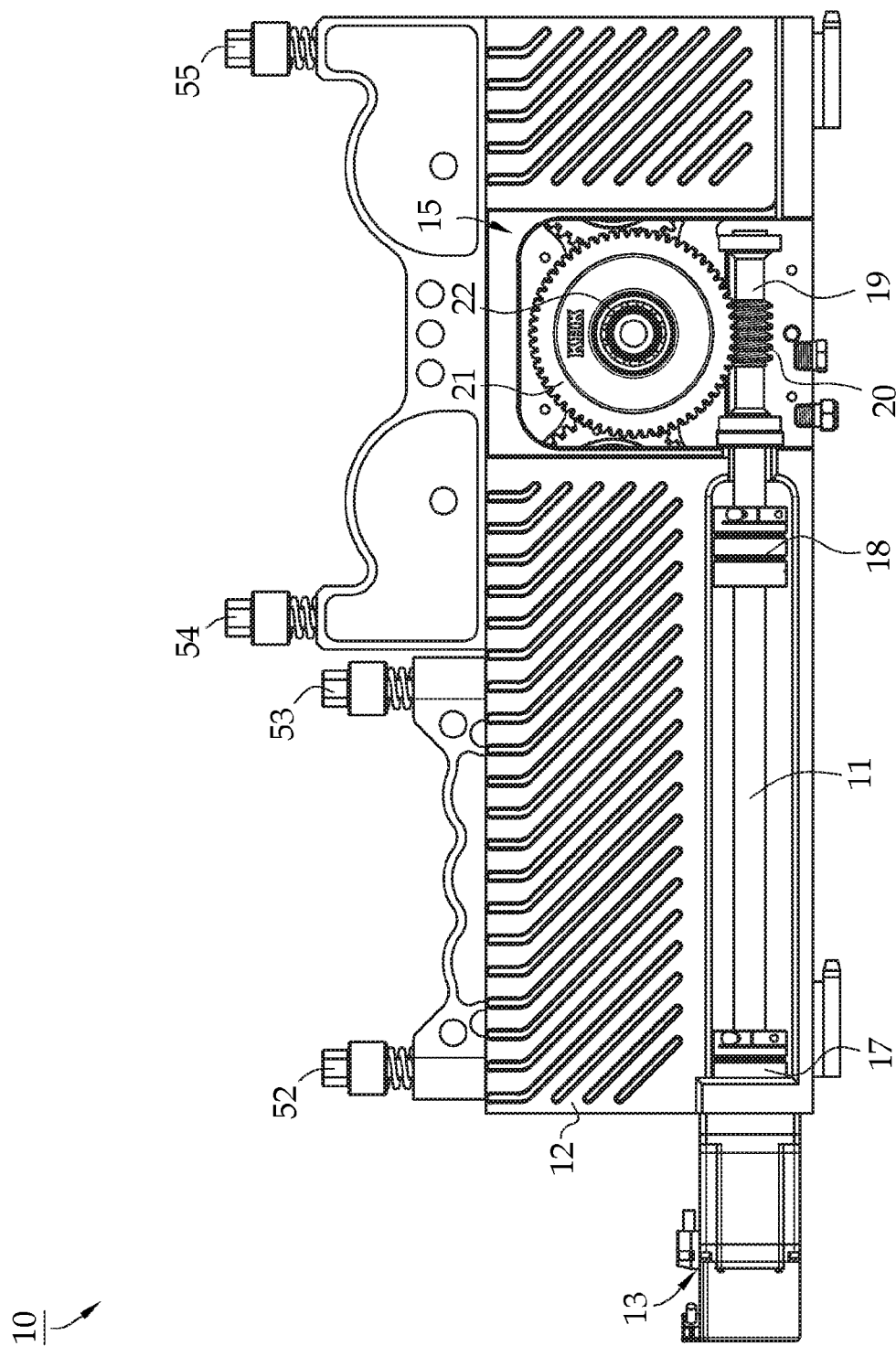
FIG. 3 depicts an opposing elevated side view of the improved wire feeder assembly of FIG. 2.
Figure 4:
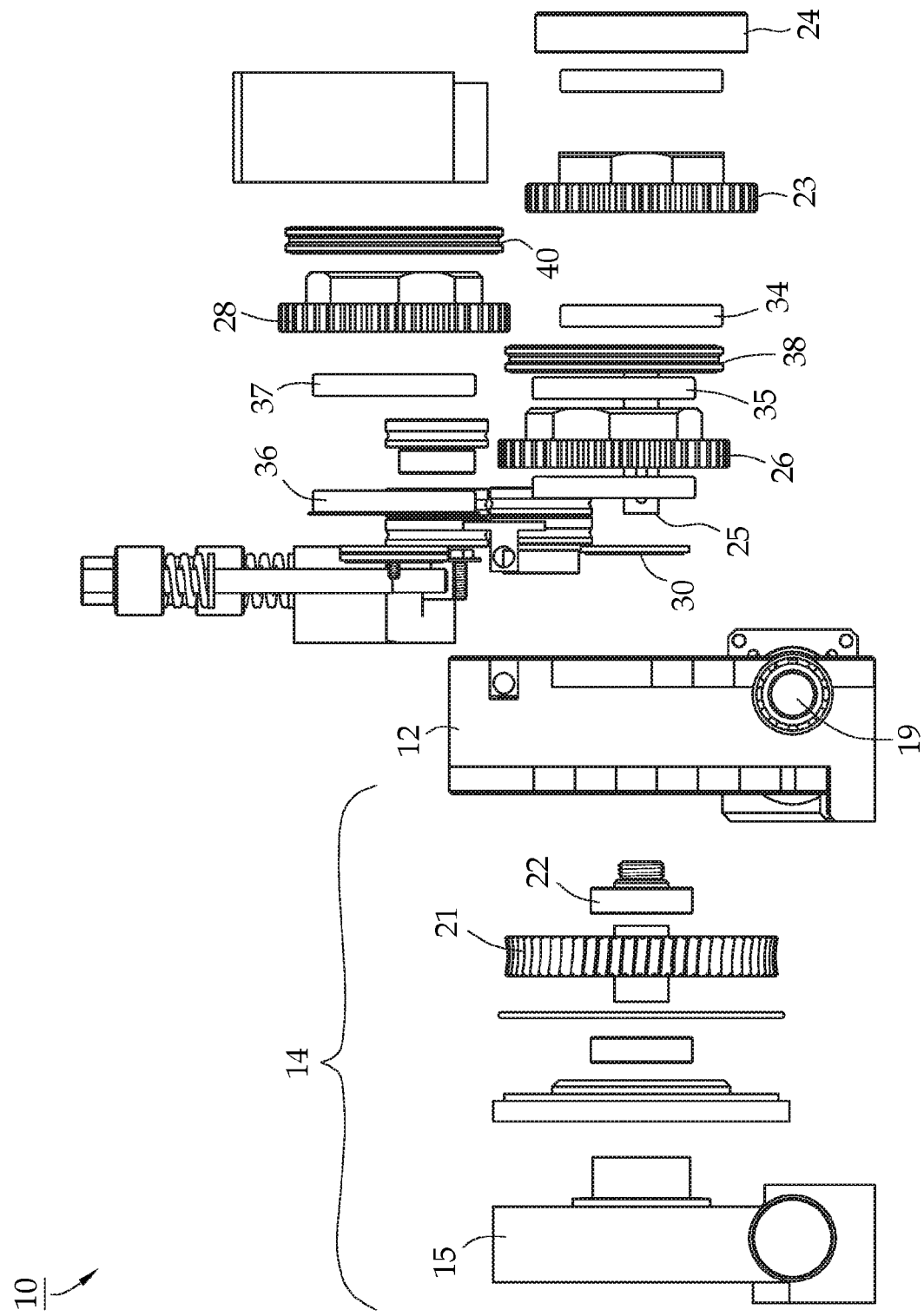
FIG. 4 demonstrates a perspective exploded view of the improved wire feeder assembly of FIG. 1.
Figure 5:
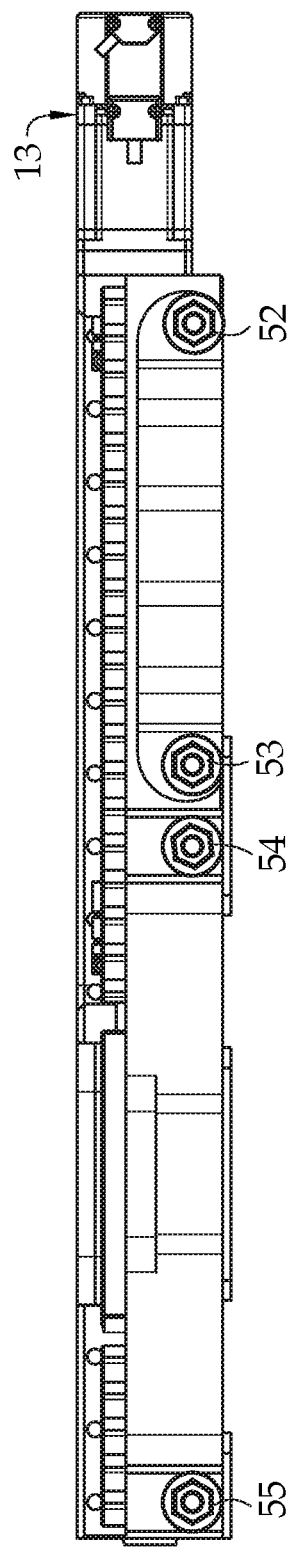
FIG. 5 illustrates a top plan view of the improved wire feeder assembly of FIG. 1.
Figure 6:
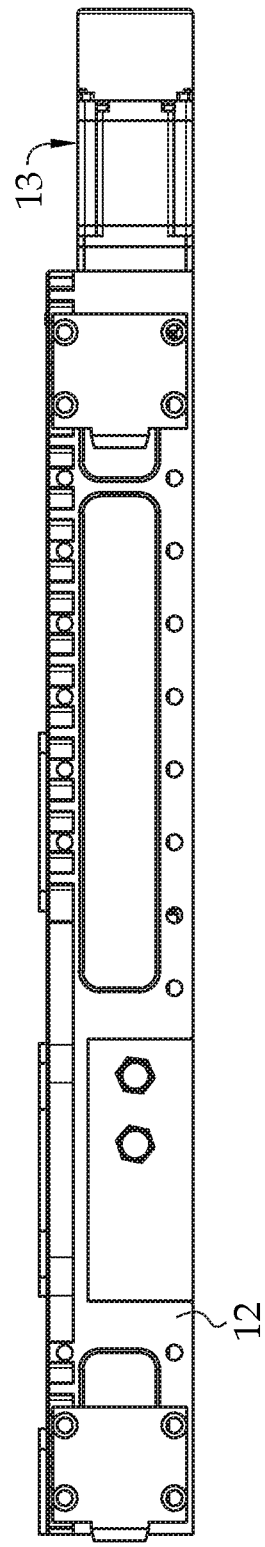
FIG. 6 features a bottom plan view of the improved wire feeder assembly of FIG. 1.
Figure 7:
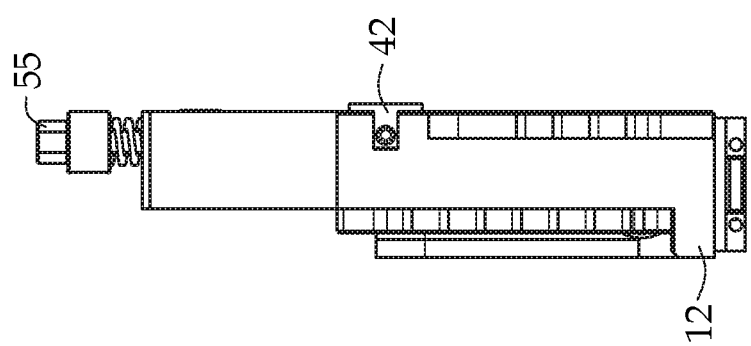
FIG. 7 shows an elevated rear view of the improved wire feeder assembly of FIG. 1.
Figure 8:
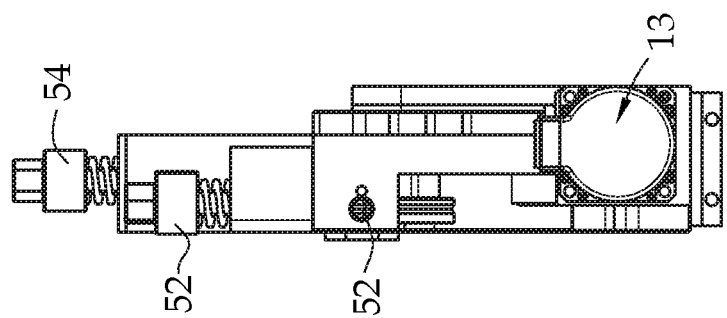
FIG. 8 illustrates an elevated front view of the improved wire feeder assembly of FIG. 1.

For a better understanding of the invention and its operation, turning now to the drawings, FIGS. 1-8 demonstrate various views of preferred wire feeder assembly 10. As used in this context, "wire feeder" relates to a wire feeder assembly used in connection with an electric arc welding process or machine, for example the one disclosed in the '571 Patent to Kostecki described above. Such an assembly is configured for use with either a solid wire or a flux core wire, although the flux core wire is preferred. Flux core wire is a hollow wire that is filled with an agent called flux (not shown). When an arc is created the flux melts and acts as a shield from the atmospheric gases that will contaminate the welds and otherwise cause porosity.

The preferred embodiment of wire feeder assembly 10 includes a driveshaft 11 positioned within an assembly housing 12 disposed between, and in communication with, a power supply 13 and a transmission 14. In the preferred embodiment, species of the power supply are defined as a motor, and more specifically a servo motor and driveshaft 11 defining a 60:1 ratio of rotation in view of transmission 14. In one embodiment, transmission 14 further comprises a transmission casing 15 and a worm gear in communication with driveshaft 11. As would be understood, a first end of driveshaft 11 is in rotatable engagement with servo motor 13 via first coupling 17. As would be understood, an end portion of cylindrical portion of driveshaft 11 and a corresponding cylindrical stem portion of servo motor 13 are each frictionally engaged by first coupling 17, for example in a clamping manner and secured in place with mechanical fasteners (not shown).

A second end of driveshaft 11 is in rotatable engagement with transmission 14 via second coupling 18. As would be understood, an opposing end portion of driveshaft 11 and a corresponding grooved rotating cylinder (often referred to as a "worm") 19 are in frictional engagement with second coupling 18. While illustrated in the figures in an assembled configuration, one feature of preferred wire feeder assembly 10 is that transmission 14 can be de-coupled from second coupling 18 and removed and/or replaced without requiring deconstruction of the remainder of wire feeder assembly 10. This is particularly desirable in the intended operating environment of preferred wire feeder assembly 10, as a transmission repair or replacement conventionally requires removal, and complete breaking down of, the global assembly. In an embodiment, an ungrooved (i.e. smooth) portion of the worm 19 engages with second coupling 18 while a plurality of threads 20 are sized, shaped, and positioned to interact with the cogs of worm gear 21. Worm gear 21 is positioned within transmission casing 15, and at least in combination with worm 19 form transmission 14.

Worm gear 21 is rotatably mounted within assembly housing 12, preferably with one or more bearings 22. One or more bearings 22 may be commonly shared with drive gear 23, which in turn preferably is in rotatable communication with drive disc 24 via shaft 25. Embodiments of shaft 25 may be round, ovular, square, or polygonal as may be desireable. As would be understood, rotatable energy is transmitted from worm gear 21 to drive disc 24 via drive gear 23 and shaft 25. Drive disc 24 forms an annual concavity about its peripheral circumference sized, shaped, and otherwise configured to support the preferred species of welding wire therein.

Drive gear 23 is in direct rotatable communication with one or both of feeder gears 26, 27, and indirect rotatable communication with one or both of feeder gears 28, 29. In this context, "direct" communication is intended to mean when the cogs of drive gear 23 physically contact the cogs of feeder gears 26, 27 while "indirect" communication is intended to mean in that although the cogs of drive gear 23 may not physically contact the cogs of feeder gears 28, 29, drive gear 23 may still provide the rotational energy to feeders gears 28, 29, for example via feeder gears 26, 27. Each of feeder gears 26, 27, 28, 29 are rotatable about retainers 30, 31, 32, 33 and bearings 34, 35, 36, 37, respectively. Additionally, or in the alternative, each of feeder gears 26, 27, 28, 29 are in rotatable communication with feeder discs 38, 39, 40, 41. These roller style discs are deployed above and below wire guides 42, 43, and 44, thereby providing a substantially linear path for the welding wire from the straightener discs (described in further detail below) to the welding substrate. In comparison to drive disc 24, feeder discs 38, 39, 40, 41 define a deeper groove about their respective annual circumferential surfaces that is sized, shaped, and otherwise configured to receive a greater portion of the welding wire therein.

It is common for welding wire to be stored in large rolls prior to being deployed in an electric arc welding device as described above. Therefore, it is desirable to straighten the wire prior to welding to increase the likelihood that the weld is formed in the intended location. Positioned immediately adjacent wire guide 44, a plurality of straightening discs 45, 46, 47, 48, 49, 50, 51, alternatingly positioned above and below the path for the welding wire as defined by wire guides 42, 43, 44, serve to receive the welding wire after it passes through carbide bushing 52 and straighten in before it enters wire guide 44. An embodiment of preferred wire feeder 10 may include sleeves positioned around straightening discs 45, 46, 47, 48, 49, 50, 51 that are positioned within channels formed by the same, the sleeves facilitating the straightening functionality of said straightening discs. Additionally, or in the alternative, one or more adjustable tensioning members 52, 53, 54, 55 comprising a nut, a spring, and a rod, are disposed throughout preferred wire feeder assembly 10 to account to specific tolerances of a given welding wire during welding activities. These tensioners can be ratcheted down or loosened depending on the specific characteristics of the welding wire in use.

Each wire feeder assembly 10 may be defined as a metal thermal fusion assembly positioning a power head spaced approximately four inches apart from the other wire feeder assemblies, each power head further comprising a worm gear-driven, individualized filler-metal feed unit that is liquid- or gas-cooled and that supplies electrical current to the power head which supplies voltage and current through insulating element(s) during arc welding activities. Each wire feeder assembly 10 may be individually controlled and every other assembly (in a series) is configured to permit a transverse "scissor" horizontal motion with an oscillating backward/forward of the forward indexing motion of a base metal plate on the welding machine (as previously referenced) in a multi-axis movement pattern designed to form a variety of weld patterns as may be desirable. The narrow profile of the wire feeder assembly disclosed herein allows up to 24 feeder assemblies to be deployed on a single machine spaced only four inches (10.16 cm) apart from one another.

The illustrations and examples provided herein are for explanatory purposes and are not intended to limit the scope of the appended claims.

The invention claimed is:

1. A wire feeder assembly comprising,
   a housing containing a drive shaft, the drive shaft in communication with a power supply at a first drive shaft end and in communication with a transmission at a second drive shaft end, the transmission defined by a threaded rotating cylinder, an unthreaded portion of the threaded rotating cylinder, and a worm gear with a plurality of cogs, wherein the plurality of cogs are sized and shaped to frictionally engage the threaded rotating cylinder, and wherein the drive shaft is in rotatable communication with the unthreaded portion of the rotating cylinder via a first coupling;
   one or more gears in rotatable communication with the transmission; and
   one or more straightening discs sized and shaped to straighten a wire as the wire passes through the wire feeder assembly.

2. The wire feeder assembly of claim 1, wherein the power supply is defined as a servo motor.

3. The wire feeder assembly of claim 2, wherein the drive shaft is in rotatable communication with the servo motor via a coupling.

4. The wire feeder assembly of claim 1, wherein at least one of the one or more gears in rotatable communication with the transmission is defined as a drive gear, the drive gear defining an annual concavity about a peripheral circumference, the annular concavity sized and shaped to support a wire therein.

5. The wire feeder assembly of claim 4 further comprising a bearing and a shaft, the bearing in rotatable communication with the transmission, the shaft in rotatable communication with the one or more gears, wherein rotation is communicated from the transmission to the one or more gears via an engagement between the bearing and the shaft.

6. The wire feeder assembly of claim 5 wherein the one or more gears are defined as a plurality of gears, the plurality of gears further defined as first and second feeders gears, each of the first and second feeders gears in rotatable communication with the drive gear.

7. The wire feeder assembly of claim 6, wherein the plurality of gears further include third and fourth feeder gears, each of the third and fourth feeder gears in rotatable communication with different ones of the first and second feeder gears.

8. The wire feeder assembly of claim 7 further comprising first, second, third, and fourth retainers, wherein each of the first, second, third, and fourth feeder gears are rotatable around different ones of the first, second, third, and fourth retainers.

9. The wire feeder assembly of claim 8 further comprising first, second, third, and fourth discs, wherein each of the first, second, third, and fourth feeder gears carries, and is in rotatable communication with, different ones of the first, second, third, and fourth discs.

10. The wire feeder assembly of claim 9, wherein the first, second, third, and fourth discs each define a groove about their respective annual circumferential surfaces, the groove sized and shaped to receive a portion of a wire therein.

11. The wire feeder assembly of claim 10, wherein the groove defined by the first, second, third, and fourth discs is deeper than the annular concavity defined by the drive gear.

12. The wire feeder assembly of claim 11 further comprising one or more wire guides, the one or more wire guides positioned proximate the drive gear and configured to direct a wire through the first, second, third, and fourth discs.

13. The wire feeder assembly of claim 12, wherein the number of one or more wire guides totals three.

14. The wire feeder assembly of claim 12 further comprising a plurality of straightening discs.

15. The wire feeder assembly of claim 14, wherein the number of plurality of straightening discs totals seven.

16. The wire feeder assembly of claim 14 further comprising one or more tensioning members configured to tighten or loosen to account for specific tolerances of a given wire during welding activities.

17. The wire feeder assembly of claim 16, wherein each tensioning member is defined by a nut, a spring, and a rod.

* * * * *